(12) United States Patent
Mathai

(10) Patent No.: US 9,079,796 B2
(45) Date of Patent: Jul. 14, 2015

(54) METHOD FOR PRODUCING CEMENT WITH SEPARATION OF $CO_2$

(71) Applicant: KHD Humboldt Wedag, Cologne (DE)

(72) Inventor: Robert Mathai, Olomouc-Nove Sady (CZ)

(73) Assignee: KHD Humboldt Wedag, Cologne (DE)

( * ) Notice: Subject to any disclaimer, the term of this patent is extended or adjusted under 35 U.S.C. 154(b) by 0 days.

(21) Appl. No.: 14/080,210

(22) Filed: Nov. 14, 2013

(65) Prior Publication Data

US 2014/0069303 A1    Mar. 13, 2014

Related U.S. Application Data

(62) Division of application No. 13/394,605, filed as application No. PCT/EP2010/061748 on Aug. 12, 2010.

(30) Foreign Application Priority Data

Sep. 10, 2009 (DE) .......................... 10 2009 041 089

(51) Int. Cl.
| | |
|---|---|
| F27B 15/00 | (2006.01) |
| C04B 7/43 | (2006.01) |
| C04B 7/36 | (2006.01) |
| F27B 7/20 | (2006.01) |
| F27D 17/00 | (2006.01) |

(52) U.S. Cl.
CPC .................. *C04B 7/367* (2013.01); *C04B 7/432* (2013.01); *F27B 7/2016* (2013.01); *F27D 17/004* (2013.01); *F27D 17/008* (2013.01)

(58) Field of Classification Search
USPC ........................ 432/14, 58; 106/739, 761, 762
See application file for complete search history.

(56) References Cited

U.S. PATENT DOCUMENTS

| | | | |
|---|---|---|---|
| 4,329,180 A | 5/1982 | Herchenbach et al. | |
| 4,496,313 A * | 1/1985 | Quittkat et al. | 432/14 |
| 4,507,153 A * | 3/1985 | Herchenbach et al. | 106/744 |
| 4,640,681 A * | 2/1987 | Steinbiss et al. | 432/14 |
| 4,913,742 A * | 4/1990 | Kwech | 106/745 |
| 6,264,738 B1 * | 7/2001 | Lorke et al. | 106/739 |
| 8,728,207 B2 * | 5/2014 | Schulz et al. | 95/134 |

(Continued)

FOREIGN PATENT DOCUMENTS

| | | |
|---|---|---|
| DE | 3010909 | 10/1981 |
| EP | 1923367 | 5/2008 |
| WO | 2010/012880 | 2/2010 |

*Primary Examiner* — Gregory A Wilson
(74) *Attorney, Agent, or Firm* — Greer, Burns & Crain, Ltd.

(57) ABSTRACT

A plant for producing cement clinker from calcium carbonate-containing raw meal. A preheating stage preheats the raw meal, which preheating stage is heated by exhaust gases from a following sintering stage. A stage is provided for deacidification and sintering of the raw meal. A cooling stage for the sintered meal is of at least two-stage design and has a gas separation stage for separating exhaust gases from the deacidification and sintering stage which is routed in a first gas circuit from the cement clinker cooling gas. A gas/gas heat exchanger is arranged downstream of the preheating stage in the gas flow direction, through which heat exchanger heat from the combined exhaust gases which leave the preheating stage is transferred into a gas, extracted from the gas for cooling the cement clinker, routed in a second gas circuit, for drying the raw meal in a preceding grinding stage.

2 Claims, 1 Drawing Sheet

(56) References Cited

U.S. PATENT DOCUMENTS

| | | |
|---|---|---|
| 2007/0248925 A1 | 10/2007 | Dupuis |
| 2010/0037804 A1 | 2/2010 | Paxton |
| 2014/0087319 A1* | 3/2014 | Leibinger ........................ 432/9 |

* cited by examiner

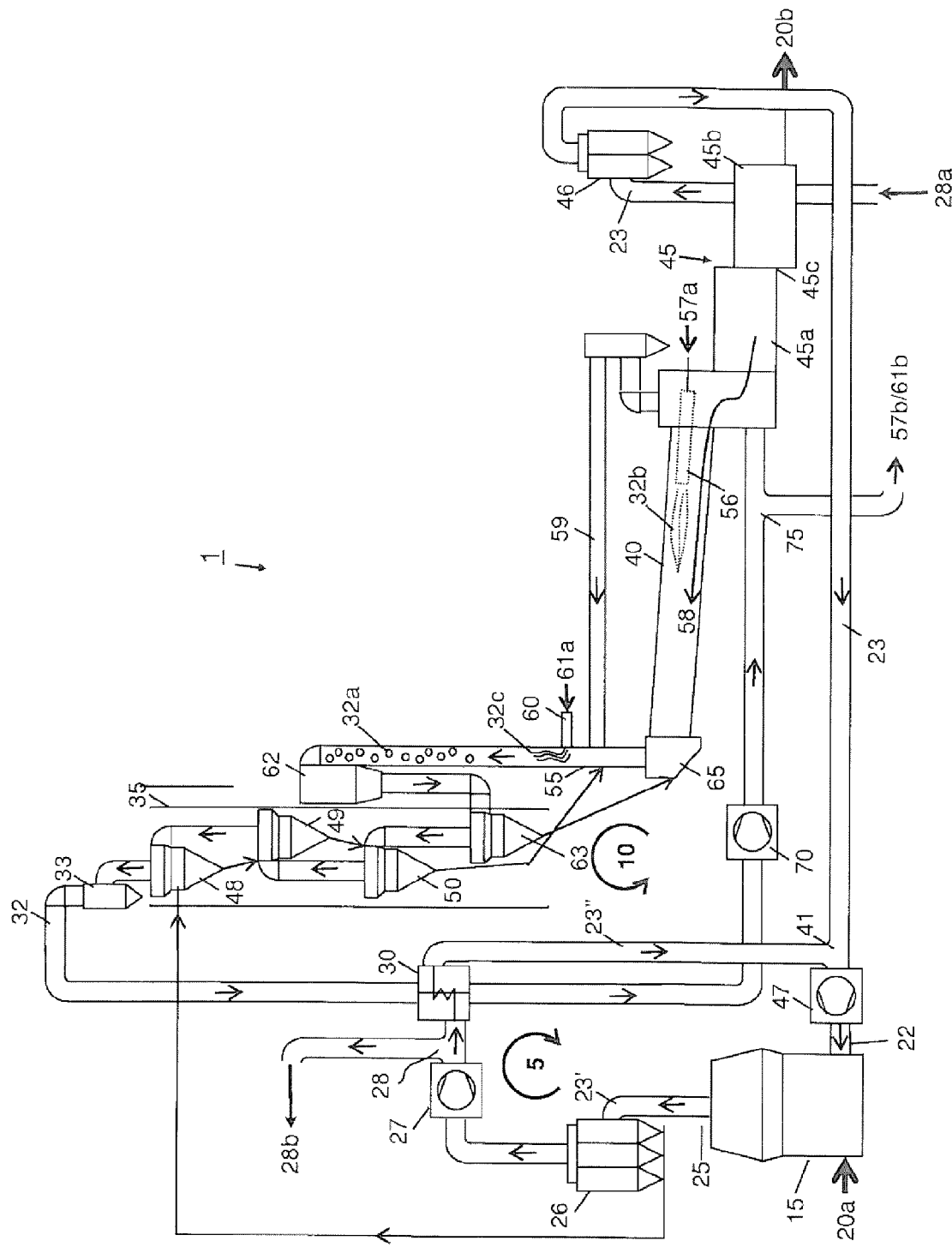

METHOD FOR PRODUCING CEMENT WITH SEPARATION OF $CO_2$

CROSS-REFERENCES TO RELATED APPLICATIONS

This is a Divisional application of U.S. Ser. No. 13/394,605 filed Mar. 7, 2012 which was a 371 of PCT/EP/2010/061748 and claiming priority to DE 10 2009 041 089.9 filed Sep. 10, 2009.

BACKGROUND OF THE INVENTION

The invention relates to methods for producing cement clinker, having the following steps: preheating calcium carbonate-containing raw meal in a preheating stage which is heated by exhaust gases from a sintering stage which follows in the gas flow direction, deacidifying the preheated raw meal, sintering the deacidified raw meal into cement clinker in a sintering stage, cooling the cement clinker from the sintering stage in a cooling stage which cools the cement clinker by means of a gas.

In the methods for producing cement which are carried out most often throughout the world, a calcium carbonate-containing initial material in the form of limestone is freed of $CO_2$ formally by the supply of heat and is thereby converted into unslaked lime, calcium oxide, and is subsequently sintered by the supply of even more heat, in the presence of silicate-containing rock, into cement clinker which is composed of various calcium silicate phases and constitutes the principal fraction of customary cement. In this case, heat energy of between 2850 and 3350 kJ is used per kg of cement clinker. The heat quantity required for this purpose is usually generated from the combustion of carbon-containing fuel. Combustion, on the one hand, and the formal freeing of $CO_2$ from the limestone, on the other hand, together form an intensive $CO_2$ source, the released $CO_2$ hitherto being introduced into the free earth's atmosphere. The $CO_2$ emission thereby generated makes an appreciable contribution to the overall anthropogenic $CO_2$ emission on earth. It is known since then that $CO_2$ is the main cause of an anticipated greenhouse effect which leads to the undesirable warming of the earth's atmosphere. The endeavor, therefore, is to reduce the $CO_2$ emission substantially.

In order to reduce the introduction of $CO_2$ into the earth's atmosphere due to the production of cement, it is necessary to rely on preventing the released $CO_2$ from escaping into the earth's atmosphere by storing it in underground caverns. Such caverns are, for example, natural gas or petroleum deposits which have for the most part been emptied. Since, in the conventional method for producing cement, very large quantities of $CO_2$ occur, which are mixed with even much larger quantities of nitrogen from atmospheric air, storage, along with compressing the exhaust gas and transferring it to the deposit, is scarcely possible in economic terms.

In the hitherto known method for producing cement, it is customary to fine-grind the calcium carbonate-containing initial material into what is known as raw meal and then first to heat it in a preheater. In the preheater, the raw meal falls in countercurrent to the gas flow direction through the hot exhaust gases of a cylindrical rotary kiln, in order first to heat by the waste heat the large quantities of limestone to be burnt. Depending on the configuration of the plant, there is then provision for deacidifying the raw meal in a cylindrical rotary kiln and sintering it into limestone in one step or for carrying out deacidification and sintering in separate plant parts. The gases which heat the raw meal and are composed of nitrogen, $CO_2$, small quantities of CO, nitrous gases and further combustion gases are then, in many plants, conducted through a heat exchanger to separate the heat still remaining in the exhaust gases and are then released into the free earth's atmosphere.

Since the exhaust gas quantities occurring in order to prevent $CO_2$ emission are very large, European patent application EP 1 923 367 A1 proposes to modify the hitherto known method for producing cement. According to the proposal of the last-mentioned patent application, preheating and deacidification are to be carried out in spatially separate regions of the plant, the exhaust gases from deacidification being circulated, along with a high degree of enrichment of $CO_2$, so that deacidification is carried out in a $CO_2$ atmosphere. The chemical balance lies in this case on the side of unslaked lime due to the heat introduced. By contrast, as is known, the exhaust gases from a cylindrical rotary kiln are used to preheat the raw meal and are then discarded by being released. In order to utilize the residual heat from the cylindrical rotary kiln exhaust gases after heat exchange with the raw meal, the last-mentioned patent application proposes to cool down the exhaust gas with the aid of a heat exchanger in favor of heating water for energy generation, during which steam occurs in the second circuit of the heat exchanger and is to be used for driving steam turbines.

The method referred to in the last-mentioned patent application therefore still causes the $CO_2$ occurring during the combustion of carbon-containing fuels to escape into the atmosphere, approximately 40% of the entire fuel burnt in the plant usually being converted in the cylindrical rotary kiln. It would be ideal if the $CO_2$ escaping here could also be captured and stored.

SUMMARY OF THE INVENTION

The object of the invention, therefore, is to increase further the degree of separation of the $CO_2$ emissions occurring in the overall process, in order thereby to reduce the $CO_2$ emission further.

The object according to the invention is achieved by combining the exhaust gases from the sintering stage with the exhaust gases from deacidification and by routing the combined exhaust gases in the open gas circuit.

Since both $CO_2$ gas sources are routed in the open gas circuit, to be precise the occurrence of $CO_2$ during deacidification, together with the occurrence of $CO_2$ from heat generation necessary for this purpose, on the one hand, and the occurrence of $CO_2$ from heat generation for sintering, on the other hand, it is possible to separate and store the entire $CO_2$ emission of a plant for producing cement. Besides, including the exhaust gases from the cylindrical rotary kiln, too, has a further advantage, to be precise that nitrous gases called nitrogen oxides or else NOx, which occur during the upgrading of $CO_2$ in the circuit necessarily reduce the concentration of atmospheric nitrogen in the circuit gas. Since less atmospheric nitrogen is present in the cylindrical rotary kiln during the generation of heat, much less atmospheric nitrogen is also burnt into nitrous gases during combustion. The occurrence of nitrous gases is much more pronounced in the cylindrical rotary kiln than during combustion in the deacidification stage, because oxidative conditions are necessary in the cylindrical rotary kiln for the desired formation of various desired calcium silicate phases as cement clinker, and under these conditions nitrogen is unavoidably oxidized into nitrous gases in the great heat of the cylindrical rotary burner.

However, combining the exhaust gases from the deacidification stage and the sintering stage is not possible without further changes to the known method. An apparently obvious solution, to be precise simply to include the exhaust gases from the cylindrical rotary kiln additionally into the circuit, is not readily possible for further plant-related reasons, since the exhaust gases from the preheater are used as lifting and drying air in a raw meal mill preceding the plant for producing cement clinker from raw meal. The initial material from which raw meal for producing cement clinker is generated is usually moist, for example because it comes from open cast mining, but also contains hydration water. In order, during preheating, to avoid the energy-intensive heating of entrained water, and also to facilitate the grinding process, using sifters, even during grinding care is taken to ensure that the raw meal is dry by using the preheater exhaust air in the grinding process. The grinding process is not a closed process, which means that there are many places in the grinding process where the initial material is in free contact with the earth's atmosphere during crushing. If, therefore, the exhaust gases from the cylindrical rotary kiln were included in the circuit, these would be absent during the required grinding. As a solution, it would therefore be necessary to seal off the grinding process with respect to infiltrated air, thus demanding a high outlay in terms of very complicated apparatus, or use is made here of a special variation, according to the invention, of the hitherto known method for producing cement.

So that the heat coming from the preheater for preheating the raw meal can be utilized for drying the initial material, it is proposed, according to the invention, to use an at least two-stage cooler for the ready-burnt cement clinker which cooler has between the two stages, for example, a middle crusher, by means of which gas separation of the two gas circuits is possible. The first stage of the cooler is included in the open gas circuit in which a highly $CO_2$-enriched gas atmosphere is present. However, the second stage of the cooler operates with atmospheric air, as in known plants, the cooler exhaust air of this part being used for lifting and drying the initial material in the grinding stage. However, since the cooler exhaust air of the second grinding stage does not carry sufficient heat with it to dry the entire initial material, the heat from the preheater is used to reheat the cooler exhaust air conducted as grinding circulation air into the grinding circuit, after this cooler exhaust air from the grinding stage is cooled, with moisture from the initial material at the same time being absorbed. The invention therefore makes use of the fact that, on the one hand, in the method according to the invention and in the corresponding plant, heated atmospheric air from the second cooler stage is available, which is not laden with exhaust gases, in particular with $CO_2$, and, on the other hand, the invention utilizes the heat from the preheating stage, which cannot readily be supplied to the grinding stage by being included in a dedicated open circuit, along with the enrichment of the $CO_2$ concentration, because an undesirable introduction of infiltrated air would take place there and would reduce the effectiveness of the method with separation of $CO_2$.

A particular feature of the method according to the invention is that it is suitable both for the conversion of those plants in which deacidification and sintering take place in a single stage, a longer cylindrical rotary kiln, and for plants in which sintering and deacidification take place is spatially separated plant parts.

BRIEF DESCRIPTION OF THE DRAWINGS

The invention is explained in more detail by means of the following figures in which:

FIG. 1 shows a sketch of a plant according to the invention for carrying out the method according to the invention.

DETAILED DESCRIPTION OF THE PREFERRED EMBODIMENTS

FIG. 1 illustrates a sketch of a flow diagram of a plant 1 according to the invention for producing cement clinker from calcium carbonate-containing initial material, which plant has two essential open gas circuits 5 and 10 separate from one another. The calcium carbonate-containing initial material for producing cement clinker runs through these two separate open gas circuits 5 and 10, at the same time traveling in the gas flow direction in the first open gas circuit 5 and for the most part flowing through the plant part in counter current in the second open gas circuit 10, the material flow of the calcium carbonate-containing initial material in the gas circuit 10 therefore being for the most part opposite to the gas flow direction.

A gas stream for drying the calcium of carbonate-containing initial material and for crushing it into raw meal in a grinding stage 15 preceding a preheating stage 35 flows in the first open gas circuit 5 which is separated from the second open gas circuit 10, the preheating stage 35 following the grinding stage 15 in the material flow direction of the plant 1.

By contrast, a gas stream, in which the calcium carbonate-containing raw meal from the first open gas circuit 5 is converted into cement clinker, flows in the second open gas circuit 10 of the plant 1.

In the overall plant 1, to produce cement clinker from calcium carbonate-containing raw meal, the calcium carbonate-containing initial material, usually a mixture, still moist from open cast mining, of limestone and of silicate-containing rock, is first fed to a grinding stage 15 at the feed point 20a. The sketch illustrates a vertical meal as a grinding stage 15, but, depending on the material properties of the calcium carbonate-containing initial material, roller presses for high-pressure crushing, or circulatory grinding plants with various grinding and sifting stages are also suitable as a grinding stage 15. In the grinding stage 15, the calcium carbonate-containing initial material is simultaneously crushed into calcium carbonate-containing raw meal to an extent such that it has a meal-like consistency and is dried by the dry cooler exhaust air 23 coming from the right at the point 22 of the grinding stage 15 in the sketch. In this case, the calcium carbonate-containing initial material to be crushed is lifted in the grinding stage 15 by the dry cooler exhaust air 23 introduced as grinding circulation air 23', sifters, not depicted here, also being present within the grinding stage 15 and discharging the calcium carbonate-containing raw meal out of a grinding circuit only beyond a specific degree of fineness. After the calcium carbonate-containing raw meal has left the grinding stage 15 at the point 25 with the aid of the partially dry cooler exhaust air 23 and partially moist grinding circulation air 23', it is separated from the then cooled and moist grinding circulation air 23' in a cascade 26 of dust separators. At this point, the path of the calcium carbonate-containing raw meal separates from the cooled and moist grinding circulation air 23' located in the open gas circuit 5.

The largely dust-free moist grinding circulation air 23' leaves the cascade 26 of dust separators in an upward direction and is compressed by a compressor 27 in order to compensate for the pressure drop in the following gas/gas heat exchanger 30 and the part gas outlet 28. Since part of the moist grinding circulation air 23' is extracted at the point 28b between the compressor 27 and gas/gas heat exchanger 30, in order to discard the moisture from the calcium carbonate-containing initial material together with the extracted moist grinding circulation air 23', and also to keep constant the gas quantity which is located in the first gas circuit 5 and which is replaced continually by new atmospheric air from the cooler air supply 28a. However, gas loss and gas introduction in the first gas circuit 5 not only take place as a result of the extraction of the moist grinding circulation air 23' at the point 28b and the cooler air supply 28a, but also by means of the introduction and discharge of infiltrated air in the grinding stage 15. Since infiltrated air is introduced into the first gas circuit 5 in the grinding stage 15, but also moist grinding circulation air 23' escapes from the first gas circuit 5, only as much moist grinding circulation air 23' is extracted between the compressor 27 and gas/gas heat exchanger 30, as mentioned above, as is necessary for the gas quantity located in the gas circuit 5 to remain constant, since it is constantly replaced by warm and still dry cooler exhaust air 23 at the point 22, the dry cooler exhaust air 23 coming from the second stage 45b of the two-stage cooler 45 in which the almost ready cement clinker is cooled by means of atmospheric air. This atmospheric air is introduced into the plant at the point 28a. The open gas circuit 5 described here is open, which means that new gas, cooler exhaust air 23, is introduced into the open gas circuit 5 and gas, moist grinding circulation air 23', leaves the open gas circuit 5. In this case, in the context of this disclosure, an "open gas circuit" is understood to mean a gas circuit which is continuously fed with gas and freed of gas, and also a gas circuit which is fed with gas and freed of gas batchwise or interruptedly.

In the gas/gas heat exchanger 30, the remaining fraction of the cooled and moist grinding circulation air 23' is heated by the heat which, together with the combined exhaust gases 32 from the preheating stage 35, escapes from the preheating stage 35 in the second open gas circuit 10. In this case, the combined exhaust gases 32 are freed in a dust separator 33 of raw meal and of cement clinker particles from the right-hand plant part which have possibly passed into the dust separator 33, and the combined exhaust gases 32 run in the second open gas circuit 10 through the gas/gas heat exchanger 30 where they discharge the heat transported by them to the cooled grinding circulation air 23' into the first gas circuit 5.

The combined exhaust gases 32 and the cooled moist grinding circulation air 23' which flow through the gas/gas heat exchanger 30 differ greatly from one another in their composition, because the moist grinding circulation air 23' largely has the composition of atmospheric air, with the exception of the moisture absorbed from the calcium carbonate-containing initial material. By contrast, the combined exhaust gases 32 have a very high CO2 fraction which comes, on the one hand, from the gas fraction of the deacidification gas CO2 32a for the deacidifying reaction of the limestone according to CaCO3⇌CaO+CO2 and, on the other hand, from the gas fraction of the combustion gas 32b which comes from the combustion of carbon-containing fuel according to C+O2⇌CO2 in the burner 56 of the sintering stage, here a cylindrical rotary kiln 40, and finally from the gas fraction of the combustion gases 32c from the combustion of carbon-containing fuel according to the above equation in the burner 60 of the calciner 55.

After the reheated moist grinding circulation air 23" has left the gas/gas heat exchanger 30, it flows to the point 41 where it is combined with the fresh dry cooler exhaust air 23, of virtually the same temperature, which flows in from the right out of the second stage 45b of the two-stage cooler 45, after the dry cooler exhaust air 23 has been freed by the dust separator 46 of cement clinker dust from the two-stage cooler 45, since the cement clinker dust coming from the two-stage cooler 45 is highly abrasive and would prematurely wear the grinding stage 15 by abrasion. The heated moist grinding circulation air 23" and the fresh cooler exhaust air 23 are then compressed by a compressor 47, and the gas circuit 5 of the dry cooler exhaust air 23, of the moist grinding circulation air 23' and of the grinding circulation air 23" having virtually the same composition as atmospheric air is closed at this point.

The above-described calcium carbonate-containing raw meal which has been separated by the dust separator 26 from the grinding circulation air 23' used as drying and lifting gas is fed by a suitable transport device, not shown here, to the preheating stage 35, the calcium carbonate-containing raw meal running through the preheating stage 35 from the top downward in countercurrent, at the same time running through the cyclone stages 48, 49 and 50 and at the same time being heated to near the temperature of the combined exhaust gases 32 which the combined exhaust gases 32 have in the second lowest cyclone stage 50 of the preheating stage 35. The heated calcium carbonate-containing raw meal falls from the second lowest cyclone stage 50 into the lower part of the calciner 55 and is lifted by the exhaust gases from the cylindrical rotary kiln 40, since in the cylindrical rotary kiln 40, a burner 56 heats the cylindrical rotary kiln 40 by combusting a mixture 57a of primary fuel with primary air, the primary air ideally being oxygen-enriched and correspondingly nitrogen-depleted air. In addition to the exhaust gases from the combustion of the mixture 57a, secondary air 58 from the first stage 45a of the two-stage cooler 45 is forced into the cylindrical rotary kiln 40 and leaves the cylindrical rotary kiln 40 via the calciner 55 together with the exhaust gases 32b from combustion.

In addition to the exhaust gases 32b and the secondary air 58 from the cylindrical rotary kiln 40, the tertiary air 59 which likewise comes from the first stage 45a of the two-stage cooler 45, also lifts the heated calcium carbonate-containing raw meal out of the second lowest cyclone stage 50 in the calciner 55. There, the calcium carbonate-containing raw meal is deacidified in an endothermic reaction in the additional heat from the burner 60 which burns a mixture 61a of secondary fuel and of an oxygen-enriched and correspondingly nitrogen-depleted air, gaseous CO2 being released and CaO remaining as a solid suspended in the combined exhaust gases 32. The combined exhaust gases 32 are therefore composed of the exhaust gases 32b and of the secondary air 58 from the cylindrical rotary kiln 40, of the tertiary air 59, of exhaust gases 32c from the combustion of the mixture 61a and of released deacidification exhaust gas CO2 32a from the deacidifying reaction. For the complete burnout of the mixture 61a, which ideally oxidizes flamelessly in the calciner 55, the suspension composed of the combined exhaust gases 32 and of the deacidified raw meal is intimately mixed in a swirl chamber 62 before it is conducted into the lowest cyclone stage 63. In this lowest cyclone stage 63, the combined exhaust gases 32 are separated from the largely deacidified raw meal from the calciner 55.

The largely deacidified raw meal subsequently leaves the lowest cyclone stage 63 and falls from there into the cylindrical rotary kiln entry chamber 65 where it passes, protected from the rising exhaust gases of the cylindrical rotary kiln 40, into the cylindrical rotary kiln 40, is sintered there into cement clinker and then leaves the cylindrical rotary kiln 40 and falls into the first stage 45a of the two-stage cooler 45. In the first stage 45a of the two-stage cooler 45, the coarse-grained sintered cement clinker is cooled by the combined exhaust gases 32 recirculated in the gas circuit 10 and cooled in the heat exchanger 30, the combined exhaust gases 32 heating up sharply and passing, on the one hand, as secondary air 58 into the cylindrical rotary kiln 40 and, on the other hand, as tertiary air 59 into the calciner 55 and thus leaving the first stage 45a of the two-stage cooler 45 again. In this case, the two-stage cooler 45 separates the gases located in the first stage 45a from the gases in the second stage 45b of the two-stage cooler 45. Such separation is possible, for example, by means of what is known as a middle crusher, as a gas separation stage, in which the still coarse-grained clinker has to pass through a clinker crusher 45c, the open gas circuits 5 and 10 being largely separated by a partition. A minimal gas slip, which occurs due to gas entrained by the coarse cement clinker to be crushed, has in this case to be taken into account.

The combined exhaust gases 32 which are separated from the largely deacidified raw meal in the lowest cyclone stage 63 run subsequently through the cyclone stage 50, thereafter the cyclone stage 49 and finally the cyclone stage 48. After the cyclone stages 50, 49 and 48, the combined exhaust gases run through the dust separator 33, and from there from the gas/gas heat exchanger 30 which, as described above, transfers the heat from the combined exhaust gases 32 to the moist and cooled grinding circulation air 23', and the combined exhaust gases 32 are compressed in a compressor 70 to compensate the pressure loss hitherto experienced and from their pass via a part gas outlet 75 back into the first stage 45a of the two-stage cooler 45 where the gas circuit 10 is closed.

The highly CO2-enriched gas located in the gas circuit 10 leaves the plant 1 at the point 57b/61b through the part gas outlet 75, this gas being delivered constantly by the exhaust gases 32, 32a, 32b, 32c from the combustion of the mixtures 57a and 61a in the burners 56 and 60 and by the deacidifying reaction of the carbonate-containing raw meal.

Only as much highly CO2-enriched combined exhaust gases 32 is taken off from the part gas outlet 75 as is introduced into the open gas circuit 10 as a result of the introduction of combustion and deacidification gases, in order to keep the gas quantity in the gas circuit 10 constant. In this case, in the context of this disclosure, as regards the gas circuit 10 too, an "open gas circuit" is understood to mean a gas circuit which is continuously fed with gas and freed of gas, and also a gas circuit which is fed with gas and freed of gas batchwise or interruptedly. The gases taken off in the part gas outlet 75 are then discarded by storage, instead of being released into the atmosphere.

A particular feature of the plant described here and of the corresponding method is that, instead of the exhaust gases from the preheater being used to dry the initial material in a preceding grinding stage, exhaust air from a clinker cooler is used for the almost ready cement clinker, the heat from the preheater being discharged to this cooler exhaust air not laden with harmful exhaust gases. The exhaust gases coming from the preheater are routed in the circuit of the plant, with the result that the degree of separation of the overall CO2 occurring in the process is greatly increased, as compared with known plants for producing cement clinker with separation of the CO2 occurring.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

| LIST OF REFERENCE SYMBOLS | |
|---|---|
| 1 | Plant |
| 5 | Open gas circuit |
| 10 | Open gas circuit |
| 15 | Grinding stage |
| 20a | Feed point |
| 22 | Point, incoming cooler exhaust air |
| 23 | Cooler exhaust air, dry |
| 23' | Grinding circulation air, moist |
| 23" | Grinding circulation air, moist, heated |
| 25 | Point, outgoing raw meal Cascade, dust separator |
| 26 | Compressor Part gas outlet |
| 27 | Cooler air supply |
| 28 | Point, outgoing cooler exhaust air |
| 28a | Gas/gas heat exchanger |
| 28b | Combined exhaust gases |
| 30 | Deacidification gas $CO_2$ |
| 32 | Combustion exhaust gas |
| 32a | Combustion exhaust gas |
| 32b | Dust separator |
| 32c | Preheating stage |
| 33 | Cylindrical rotary kiln |
| 41 | Point, combination of cooler exhaust gases 23, 23' Two-stage cooler |
| 45 | First stage |
| 45a | Second stage |
| 45b | Clinker crusher, gas |
| 45c | separation stage Dust separator |
| 46 | Compressor |
| 47 | Cyclone stage |
| 48 | Cyclone stage |
| 49 | Cyclone state |
| 50 | Calcinor |
| 55 | Burner |
| 56 | Mixture, fuel |
| 57 | Point, outgoing gas |
| 57b | Secondary air |
| 58 | Burner |
| 60 | Mixture, fuel |
| 61 | Point, outgoing gas |
| 61b | Swirl chamber |
| 62 | Cyclone stage |
| 63 | Cylindrical rotary kiln entry |
| 65 | chamber |
| 70 | Compressor Part gas outlet |

The invention claimed is:

1. A plant for producing cement clinker, the plant comprising:

a grinding stage to grind calcium carbonate-containing initial material into calcium carbonate-containing raw meal;

a deacidifying stage to deacidify the raw meal and generate exhaust gases;

a sintering stage to sinter the raw meal into cement clinker and generate exhaust gases;

a combining stage to combine the exhaust gases from the sintering stage with the exhaust gases from the deacidifying stage in a first open gas circuit;

a preheating stage to preheat the raw meal prior to deacidifying by the combined exhaust gases from the sintering stage and the deacidifying stage;

a cooling stage to cool the cement clinker from the sintering stage, the cement clinker being cooled by circulation air in a separate second open gas circuit, wherein the circulation air becomes heated and is delivered to the grinding stage;

a transferring stage to transfer heat from the combined exhaust gases from the preheating stage in the first open gas circuit to the circulation air from the grinding stage in the second open gas circuit without mixing the gases between the first and second gas circuits, such that the combined exhaust gases are cooled, and simultaneously the circulation air is reheated by the heat transfer;

a combining stage, after the heat transfer, to combine the reheated circulation air with the circulation air heated in the cooling stage such that the combined circulation air is introduced into the grinding stage to dry the raw meal;

a first separating stage to separate a fraction of the combined exhaust gases from the first open gas circuit, a quantity fraction of the separated fraction of the combined exhaust gases corresponding to a fraction which is newly added to the first open gas circuit in the first open gas circuit as a result of combustion and deacidification; and a second separating stage to separate a fraction of the circulation air from the second open gas circuit, a quantity fraction of the separated fraction of the circulation air corresponding to a fraction which is newly added to the second open gas circuit in the second open gas circuit as a result of atmospheric air intake at the cooling stage.

2. The plant as claimed in claim 1, wherein the deacidifying stage is separated spatially from the sintering stage, the sintering stage following the deacidifying stage in a gas flow direction.

* * * * *